(12) United States Patent
Craig et al.

(10) Patent No.: US 8,561,509 B2
(45) Date of Patent: Oct. 22, 2013

(54) MECHANICAL-ACTIVATED ID GROOVING TOOL

(75) Inventors: Karen Anne Craig, Greensburg, PA (US); Anthony Paul Sones, Friendswood, TX (US); Michael Anthony Weisel, Latrobe, PA (US); Allen W. Poponick, Nuremberg (DE)

(73) Assignee: Kennametal Inc., Latrobe, PA (US)

( * ) Notice: Subject to any disclaimer, the term of this patent is extended or adjusted under 35 U.S.C. 154(b) by 581 days.

(21) Appl. No.: 12/816,169

(22) Filed: Jun. 15, 2010

(65) Prior Publication Data

US 2011/0303058 A1 Dec. 15, 2011

(51) Int. Cl.
*B23B 29/034* (2006.01)

(52) U.S. Cl.
USPC .............................. 82/1.2; 408/153; 408/158

(58) Field of Classification Search
USPC ............... 82/1.2, 1.4, 1.11, 70.1, 82, 88, 113; 408/153, 158, 161, 168; 74/53, 55; 15/104.011, 104.012
See application file for complete search history.

(56) References Cited

U.S. PATENT DOCUMENTS

| | | | |
|---|---|---|---|
| 2,038,611 A | | 4/1936 | Simonson |
| 2,247,284 A | | 6/1941 | Young |
| 2,333,935 A | | 11/1943 | Jones |
| 2,365,549 A | * | 12/1944 | Haynes ............................ 82/1.2 |
| 2,545,443 A | * | 3/1951 | Bowren ........................... 82/1.2 |
| 2,848,912 A | * | 8/1958 | Kalat ............................... 82/1.2 |
| 2,869,404 A | | 1/1959 | Condrac |
| 3,195,378 A | * | 7/1965 | Cogsdill ......................... 408/26 |
| 3,208,312 A | * | 9/1965 | Heuser ............................ 82/1.2 |
| 3,228,265 A | * | 1/1966 | Stoddard et al. .............. 408/158 |
| 3,299,749 A | * | 1/1967 | Koppelmann .................... 82/1.4 |
| 3,625,625 A | * | 12/1971 | Van Roojen et al. ......... 408/158 |
| 4,067,251 A | | 1/1978 | Eckle et al. |
| 4,220,429 A | | 9/1980 | Powers et al. |
| 4,409,868 A | | 10/1983 | Huddle et al. |
| 4,527,449 A | * | 7/1985 | Sydlowski et al. .......... 76/108.1 |
| 4,564,321 A | | 1/1986 | Kondo et al. |
| 4,606,680 A | | 8/1986 | Striegl |
| 4,612,831 A | * | 9/1986 | Lehmkuhl ........................ 82/1.4 |
| 4,674,923 A | | 6/1987 | Ogilvie et al. |
| 4,784,537 A | | 11/1988 | Baker |
| 4,841,636 A | | 6/1989 | Huggins |

(Continued)

FOREIGN PATENT DOCUMENTS

| | | |
|---|---|---|
| DE | 4022579 A1 | 7/1990 |
| DE | 102007060500 A1 | 6/2009 |

(Continued)

*Primary Examiner* — Daniel Howell
*Assistant Examiner* — Nicole N Ramos
(74) *Attorney, Agent, or Firm* — Larry R. Meenan, Esq.

(57) ABSTRACT

A mechanical-activated inner diameter (ID) grooving tool includes a shank, a body, a stopper, an insert cartridge, a bushing and an end cap. The shank includes a tapered piston having an extension surface and a retraction surface. The insert cartridge includes a tapered piston pocket having a piston-engaging face and a piston-retracting face. Axial movement of the tapered piston in a first direction causes the extension surface of the tapered piston into contact with the piston-engaging face of the insert cartridge, thereby causing the insert cartridge to move in a radially outward direction. Axial movement of the tapered piston in a second, opposite direction causes the retraction surface of the tapered piston into contact with the piston-retracting face of the insert cartridge, thereby causing the insert cartridge to move in a radially inward direction.

7 Claims, 9 Drawing Sheets

(56) References Cited

U.S. PATENT DOCUMENTS

| | | |
|---|---|---|
| 5,085,541 A | 2/1992 | Simpson, III |
| 5,095,785 A | 3/1992 | Noggle |
| 5,120,167 A * | 6/1992 | Simpson ............... 408/158 |
| 5,183,089 A | 2/1993 | Norlander et al. |
| 5,308,197 A | 5/1994 | Little |
| 5,392,674 A | 2/1995 | Mihic |
| 5,505,569 A | 4/1996 | Gustafsson et al. |
| 5,947,649 A | 9/1999 | Arai et al. |
| 6,331,093 B1 | 12/2001 | Graham et al. |
| 6,655,883 B2 * | 12/2003 | Maar ............... 408/158 |
| 6,719,501 B2 | 4/2004 | Sekiguchi et al. |
| 6,733,212 B2 | 5/2004 | Nagaya et al. |
| 6,846,136 B2 | 1/2005 | Brock et al. |
| 6,857,344 B1 | 2/2005 | Diller |
| 7,089,837 B2 * | 8/2006 | Feil et al. ............... 82/1.4 |
| 7,393,160 B2 | 7/2008 | Volokh |
| 7,445,409 B2 | 11/2008 | Trice et al. |
| 7,510,353 B2 | 3/2009 | Kramer |
| 7,607,868 B2 | 10/2009 | Noggle |
| 7,699,567 B2 | 4/2010 | Nedzlek |
| 2005/0150336 A1 | 7/2005 | Cambrey |
| 2008/0170921 A1 | 7/2008 | Sjoo |
| 2009/0290943 A1 | 11/2009 | Noggle |
| 2011/0303057 A1 | 12/2011 | Craig et al. |

FOREIGN PATENT DOCUMENTS

| | | |
|---|---|---|
| EP | 0187647 A3 | 12/1987 |
| EP | 0291933 A | 11/1988 |
| EP | 1123765 A1 | 8/2001 |
| FR | 1234204 A | 10/1960 |
| GB | 2481311 A | 12/2011 |
| GB | 2481312 A | 12/2011 |
| JP | 52003792 A | 1/1977 |
| JP | 07266121 A | 10/1995 |
| JP | 08071811 A | 3/1996 |
| JP | 2003205407 A | 7/2003 |
| WO | WO-9614181 A | 5/1996 |

* cited by examiner

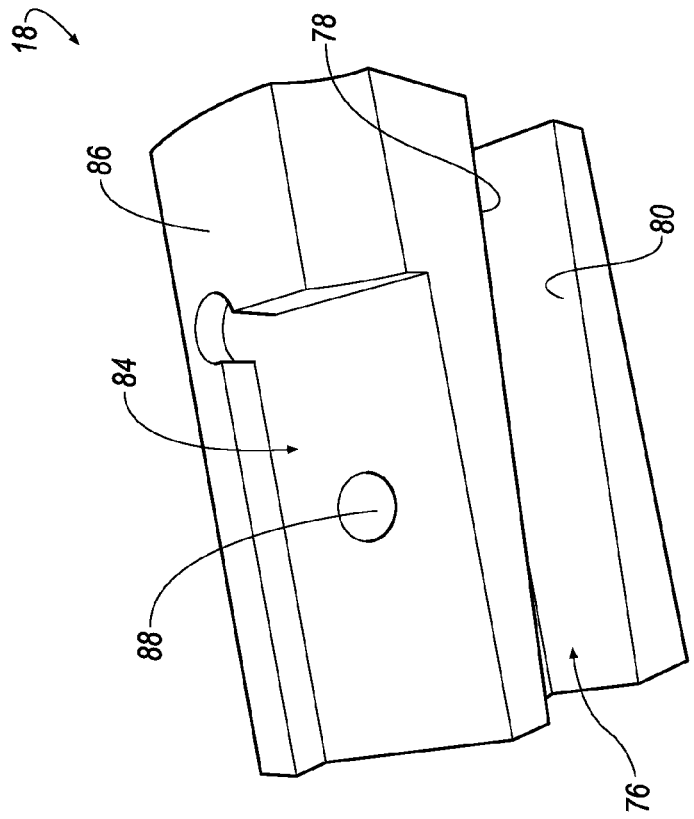
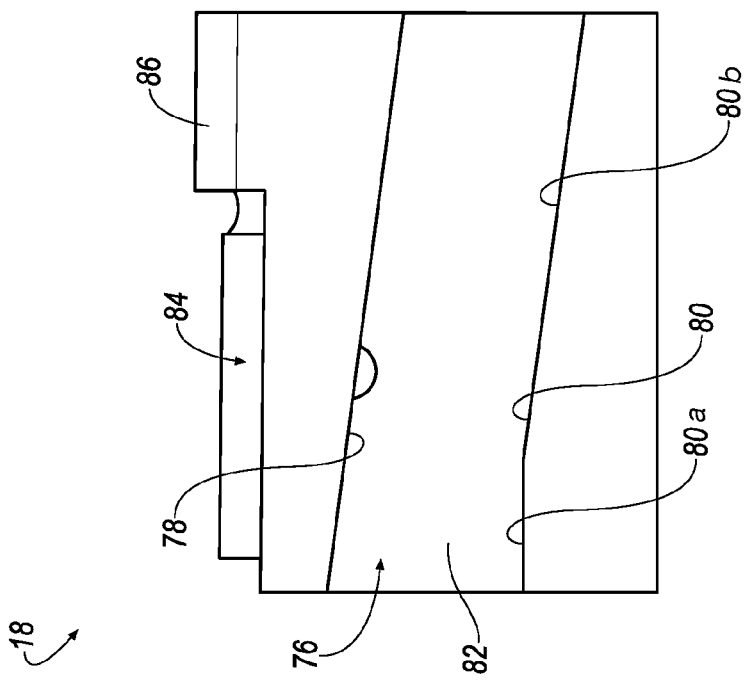
FIG. 9
FIG. 8

MECHANICAL-ACTIVATED ID GROOVING TOOL

CROSS-NOTING TO RELATED APPLICATIONS

This application is related to application Ser. No. 12/816,145, filed Jun. 15, 2010 entitled "Pressure-Activated ID Grooving Tool," now U.S. Pat. No. 8,408,849.

BACKGROUND OF THE INVENTION

1. Field of the Invention

The invention relates to machine tools for cutting inside grooves in a hole of a work piece.

2. Background of the Invention

It is often necessary or desirable to create an internal recess or groove within a tube or hole of a machine part. This process is accomplished using a grooving tool attached to a tool holder on a rotary drive. The end of the grooving tool that is placed in the hole has one or more cutting inserts. These cutting inserts are often radially extendable and retractable. This feature allows the tool to be inserted into a hole, then rotated and extended radially to form the groove along the inside surface of the hole.

Extendable inserts are well known in the prior art. U.S. Pat. No. 2,333,935 and U.S. Pat. No. 2,545,443 each shows extendable inserts for internal grooving. Generally, a central rod is moved in an axial direction and has a tapered surface at its end. The tapered surface engages one or more cutting inserts in a wedging action to convert the axial force into a radial force moving the insert into cutting position. The means for moving the central rod is often mechanical, but electrical or hydraulic movement of such a rod is not new to the art. Regardless of the means for effecting movement, an elaborate control system was always required to control the movement of the central rod. This control is necessary because the position of the central rod determines the diameter of a cut that will be made in the wall of the workpiece.

Current grooving tool technology is also limited by how far a tool is able to reach into a workpiece. The reason for this limitation in the art today is that the means of controlling the diameter of the cut must be in close proximity to the cutting insert.

Another problem of the current technology is the inability of an insert to retract after the cut is complete. Chips or debris interfering with the motion or spring failure can cause the insert to not retract. Most grooving tools now employ a spring to directly pull an insert back to a retracted position. A relatively strong spring is required to overcome the force required to pull an insert back into start position. Spring failure can be serious problem. Because the spring is often the only means of retaining the insert in the shank, failure of the spring can lead to the insert being stuck in an extended position and fouling itself in the workpiece.

BRIEF SUMMARY OF THE INVENTION

The inventors have recognized the problems associated with conventional grooving tools and have developed an improved tool that remedies many deficiencies of the prior art.

In one aspect, a mechanical-activated inner diameter (ID) grooving tool comprises a shank, a body, an insert cartridge, a stopper, an end cap and a bushing. The shank includes a shank end and a working end, the working end including a tapered piston having an extension surface and a retraction surface forming an acute angle relative to a central longitudinal axis, $C_L$, of the tool. The body is disposed about the working end of the shank, the body including a shank-receiving portion and a piston-receiving portion, the piston-receiving portion including a pair of legs defining a central cavity therebetween. The insert cartridge is received in the central cavity of the body, the insert cartridge including a tapered piston pocket having a piston-engaging face, a piston-retracting face, the piston-engaging face adjacent the extension surface of the tapered piston and the piston-retracting face adjacent the retraction surface of the tapered piston when the tool is assembled, the insert cartridge having an insert-receiving pocket capable of having a cutting insert mounted thereon. The stopper is disposed about a portion of the body. The end cap is mounted to an end of the body. The bushing is disposed about a portion of the shank for allowing rotational movement of the shank, the body and the insert cartridge relative to the stopper. Axial movement of the tapered piston in a first direction causes the extension surface of the tapered piston into contact with the piston-engaging face of the insert cartridge, thereby causing the insert cartridge to move in a radially outward direction. Axial movement of the tapered piston in a second, opposite direction causes the retraction surface of the tapered piston into contact with the piston-retracting face of the insert cartridge, thereby causing the insert cartridge to move in a radially inward direction.

In another aspect, a method for making grooves within a bore of a work piece comprises:

inserting a piston-receiving portion of a body of a grooving tool into the bore of the work piece until a stopper contacts the work piece;

moving a shank of the grooving tool in a first axial direction while the stopper is in contact with the work piece causing an extension surface of the tapered piston into contact with a piston-engaging face of an insert cartridge, thereby causing the insert cartridge to move in a radially outward direction and pushing a cutting insert into contact with the work piece; and rotating the shank to begin a cutting operation

BRIEF DESCRIPTION OF THE DRAWINGS

Further features of the present invention, as well as the advantages derived therefrom, will become clear from the following detailed description made with reference to the drawings in which:

FIG. 8 is a top view of the insert cartridge of the grooving tool;

FIG. 9 is a perspective view of the insert cartridge of the grooving tool; and

DETAILED DESCRIPTION OF THE INVENTION

Figure 1:
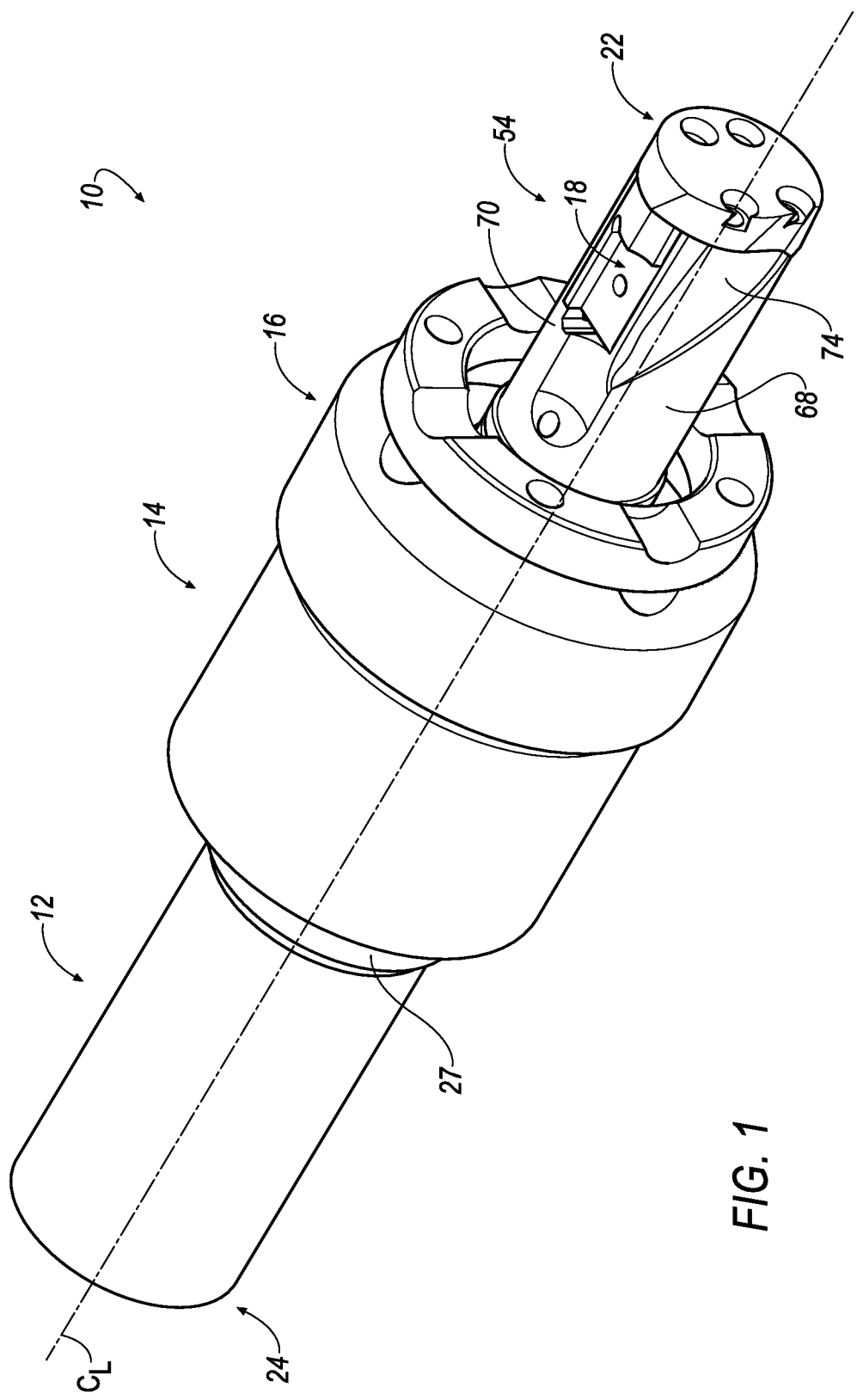
FIG. 1 is a perspective view of a mechanical-activated ID grooving tool according to an embodiment of the invention.
Figure 2:
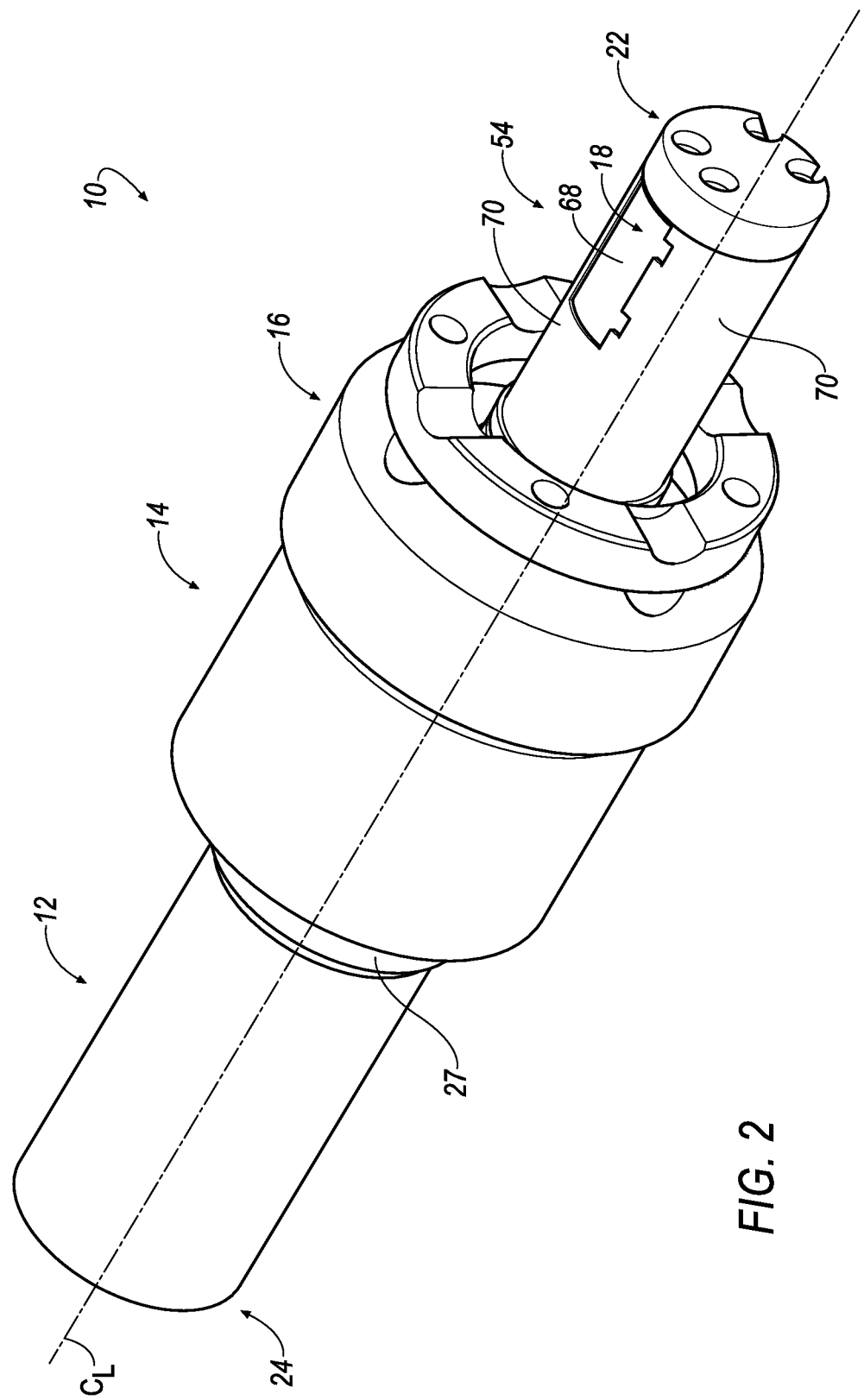
FIG. 2 is another perspective view of the mechanical-activated ID grooving tool.
Figure 3:
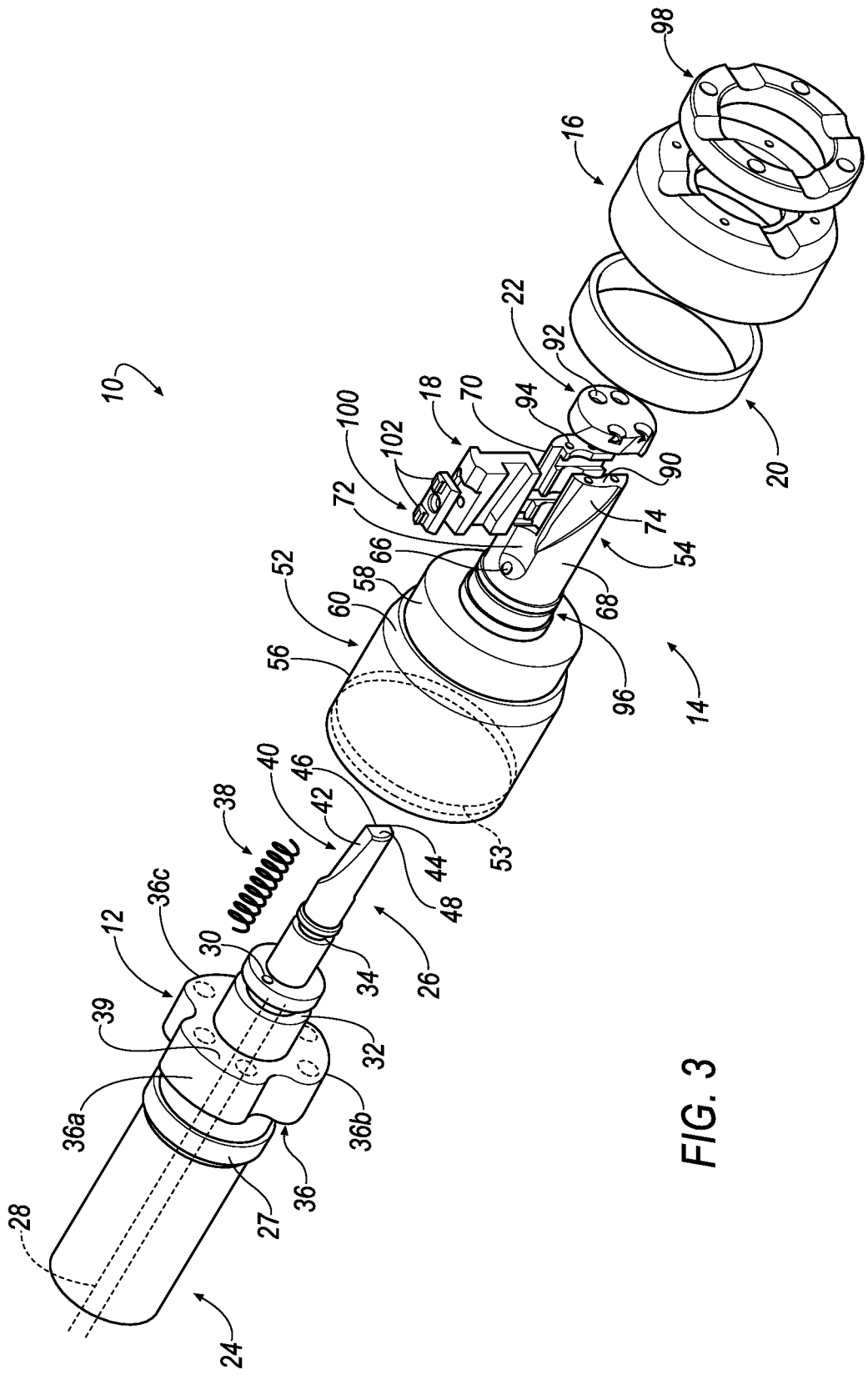
FIG. 3 is an exploded view of the ID grooving tool of FIGS. 1 and 2.
Figure 4A:
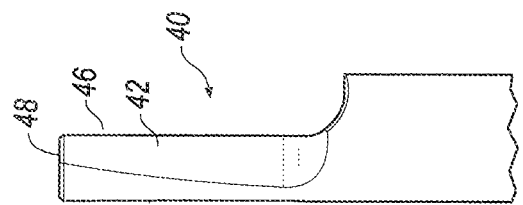
FIGS. 4a-d are various perspectives of the tapered piston.
Figure 4B:
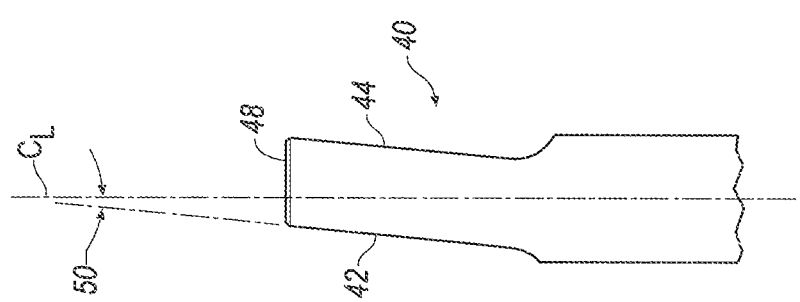
Figure 4C:
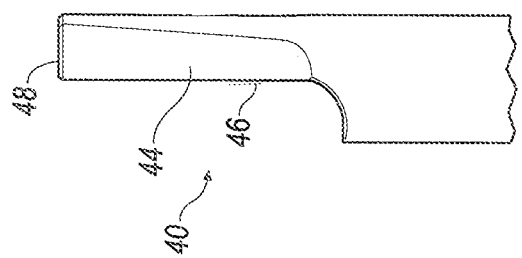
Figure 4D:
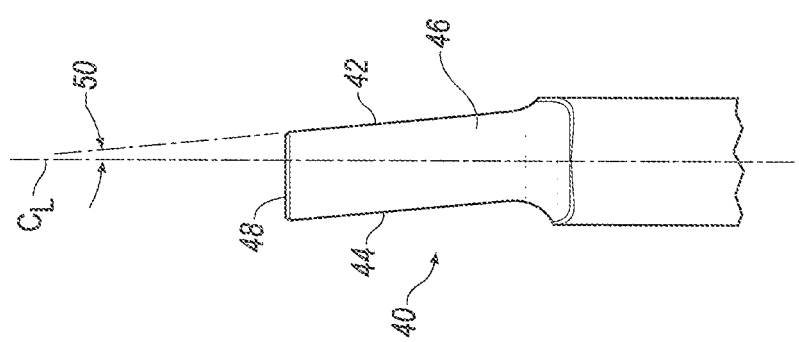
Figure 5:
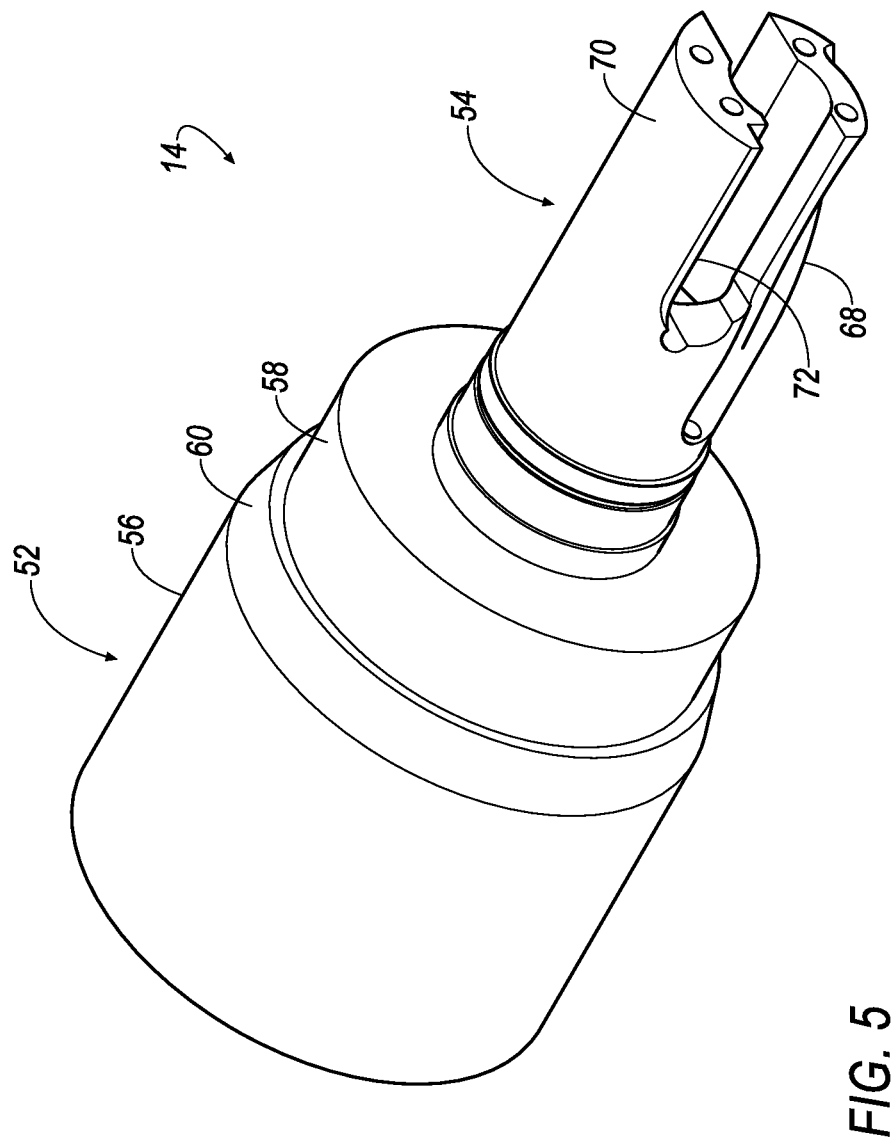
FIG. 5 is a perspective view of the body of the grooving tool.
Figure 6:
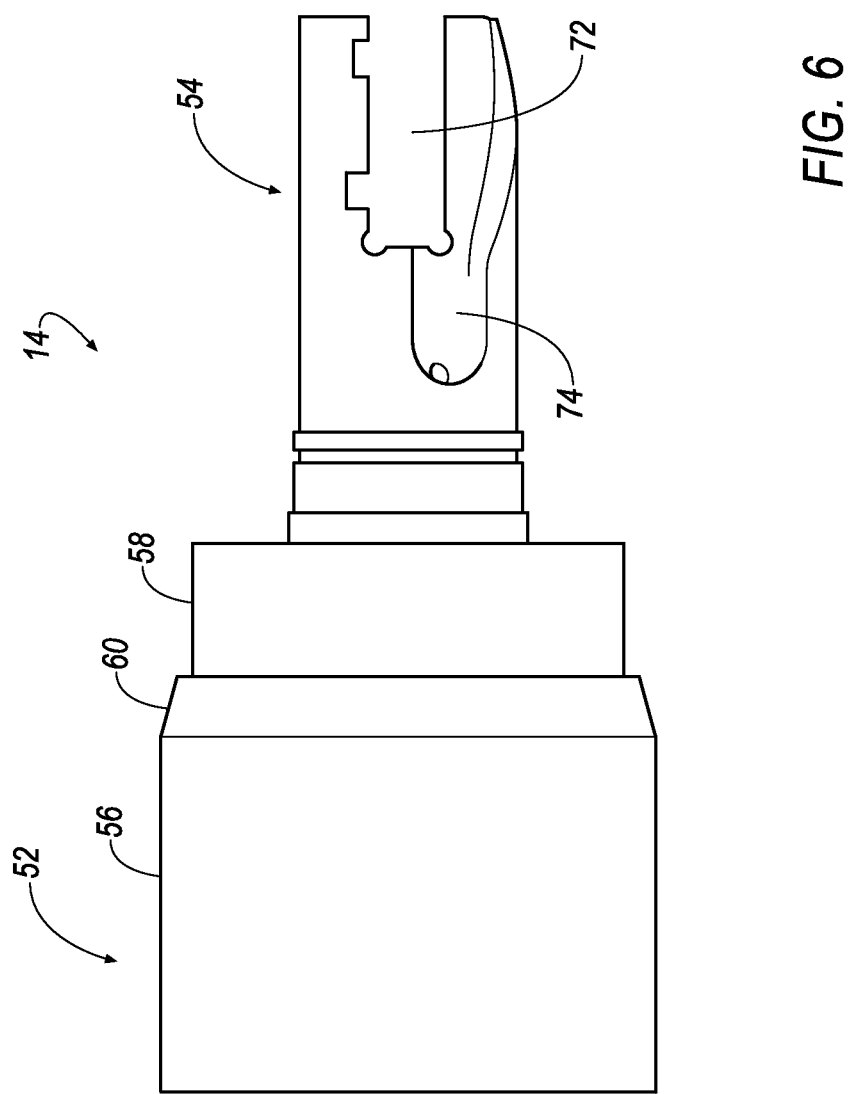
FIG. 6 is another perspective view of the body of the grooving tool.

Referring to FIGS. 1-3, a mechanical-activated ID grooving tool 10 is shown according to an embodiment of the invention. In general, the grooving tool 10 consists of six main components: a shank 12, a body 14, a stopper 16, an insert cartridge 18, a bushing 20 and an end cap 22.

The shank 12 includes a shank end 24 and a working end 26. The shank end 24 is the portion of the grooving tool 10 that connects to an extension, collet or chuck of a rotary tool (not shown). The shank end 24 may include a band 27 to provide a visual aid to inform the operator where the feed rate zone starts and stops. Specifically, the feed rate zone starts when the band 27 is at the top of the body 14 and stops when the band 27 is no longer visible. A fluid channel 28 (shown in phantom in FIG. 3) extends from the shank end 24 to an outlet port 30 for providing a fluid path from the rotary tool to the working end 26. The diameter of the channel 28 is a matter of hydraulic design commonly known in the art. The shank 12 includes a pair of grooves 32, 34, one on each side of the outlet port 30 for receiving sealing members (not shown), such as O-rings, and the like.

A drive member 36 is located between the shank end 24 and the working end 26. In the illustrated embodiment, the drive member 36 is clover-shaped having three leaves 36a, 36b and 36c symmetrically disposed about 120° with respect to each other. It will be appreciated that the invention is not limited by the number of leaves of the drive member 36, and that the invention can be practiced with any desirable number of leaves, such as four leaves, five leaves, and the like. The purpose of the drive member 36 is to act as a stop for a plurality of down feed springs 38 that provide a biasing force between the shank 12 and the body 14. In the illustrated embodiment, two down feed springs 38 contact a front face 39 of each of the three leaves 36a-c of the drive member 36 for a total of six (6) down feed springs 38 (as indicated by the dashed lines, but only one down feed spring 38 is shown in FIG. 3). It will be appreciated that the invention is not limited by the number of down feed springs 38, and that the invention can be practiced with any desirable number of springs that will provide the desired biasing force for the shank 12 against the body 14. For example, the invention can be practiced with a total of three down feed springs 38, and the like. The drive member 36 can be integrally formed with the shank 12, or alternatively can be separately formed. If separately formed, the drive member 36 can be secured to the shank 12 by means of a snap ring (not shown), and the like.

Referring now to FIGS. 3 and 4a-d, the working end 26 of the shank 12 includes a tapered piston, shown generally at 40. The tapered piston 40 has two parallel surfaces: one parallel surface being an extension surface 42 and the other parallel surface being a retraction surface 44. The parallel surfaces 42, 44 form an acute angle 50 relative to a central longitudinal axis, $C_L$, of the tool 10. In one embodiment, the angle 50 is between about 1° and about 15°, and preferably about 5° relative to the central longitudinal axis, $C_L$. This arrangement provides an 11.5:1 mechanical advantage. A third surface of the tapered piston 40 is a center surface 46 that is substantially perpendicular to each of the surfaces 42, 44. A fourth surface of the tapered piston 40 is a tip surface 48 that is substantially perpendicular to each of the surfaces 42, 44 and 46. In the illustrated embodiment, the surfaces 42, 44, 46 and 48 are substantially planar. However, it should be noted that the shape of the tapered piston 40 described herein is limited only by the need for the two substantially parallel surfaces 42, 44 set at an angle 50 relative to the central longitudinal axis, $C_L$, of the tool 10.

Figure 7:
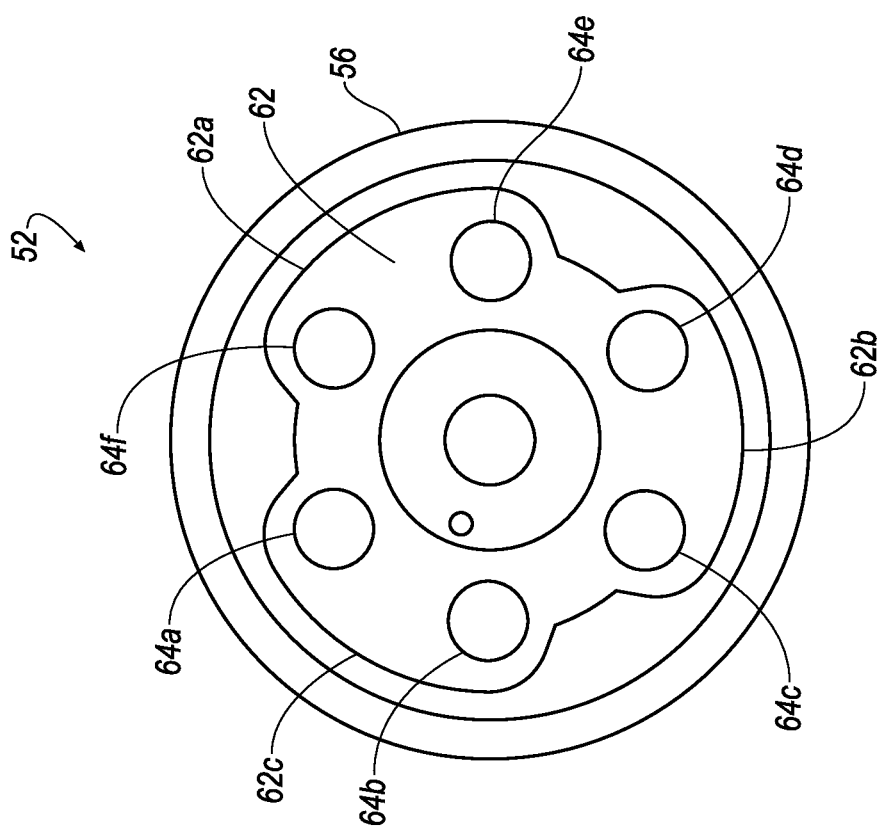
FIG. 7 is an end view of the body of the grooving tool.

Referring now to FIGS. 3 and 5-7, the body 14 includes a shank-receiving portion 52 and a piston-receiving portion 54. The shank-receiving portion 52 has a larger-diameter portion 56, a relatively smaller-diameter portion 58, and a radius blend 60 therebetween. A portion of the body 14 is disposed about the working end 26 of the shank 12. The bushing 20 is disposed about the smaller-diameter portion 58 of the shank 12 and allows rotational movement of the shank 12, the body 14, the insert cartridge 18 and the end cap 22 relative to the stopper 16. As shown in FIG. 7, the inner wall of the larger-diameter portion 56 includes a recess 62 with three leaves 62a, 62b and 62c symmetrically disposed about 120° with respect to each other. The leaves 62a-c correspond in number and shape to the leaves 36a-c of the shank 12 such that the leaves 36a-c are capable of being received in the leaf-shaped recess 62. In addition, the recess 62 includes a plurality of spring-receiving recesses 64a-f that correspond in number and shape to the plurality of down feed springs 38 such that each spring 38 is capable of being received in a corresponding recess 64a-f. The inner wall of the body 14 also includes a port 66 to allow fluid to pass from the fluid channel 28 of the shank 12, through the port 66, and proximate the cutting insert 100. The piston-receiving portion 54 of the body 14 includes a pair of legs 68, 70 defining a central cavity 72 therebetween. The central cavity 72 is capable of receiving the insert cartridge 18. The piston-receiving portion 54 also includes a helically-shaped flute 74 to facilitate in the removal of chips. In the illustrated embodiment, the flute 74 is left-handed (opposite to the direction of cut) to push the chips forward, rather than pulling the chips up to the body 14, which might cause damage to the body 14. It should be understood that the invention can be practiced with a right-handed flute, so long as the flute 74 is opposite to the direction of cut to push the chips forward. The body 14 may be held in a fixed relationship to the shank 12 by a snap ring (not shown) inserted into a snap ring groove 53 (shown in phantom in FIG. 3).

Referring now to FIGS. 3, 8 and 9, the insert cartridge 18 includes a tapered piston pocket 76 congruently shaped to mate with the tapered piston 40. The tapered piston pocket 76 has a piston-engaging face 78, a piston-retracting face 80, and a center face 82. The piston-retracting face 80 includes a first portion 80a and a second portion 80b formed at an angle with respect to the first portion 80a, as shown in FIG. 8. The piston-engaging face 78 is adjacent to and faces the extension surface 42 of the tapered piston 40 when the tool is assembled. Similarly, the piston-retracting face 80 is adjacent to and faces the retraction surface 44 of the tapered piston 40 when the tool 10 is assembled. The center face 82 is adjacent to and faces the center surface 46 of the tapered piston 40 when the tool 10 is assembled. The insert cartridge 18 also includes an insert-receiving pocket 84 on a radially-outward surface 86 of the insert cartridge 18. The insert-receiving pocket 84 has a threaded bore 88 that is aligned perpendicular to the central axis, CL, of the tool 10 and is capable of receiving a threaded fastener (not shown) to mount a cutting insert 100 in the insert-receiving pocket 84 of the insert cartridge 18. In the illustrated embodiment, the cutting insert 100 includes a pair of cutting edges 102 for forming a pair of grooves in the within the tube (not shown).

Figure 10:
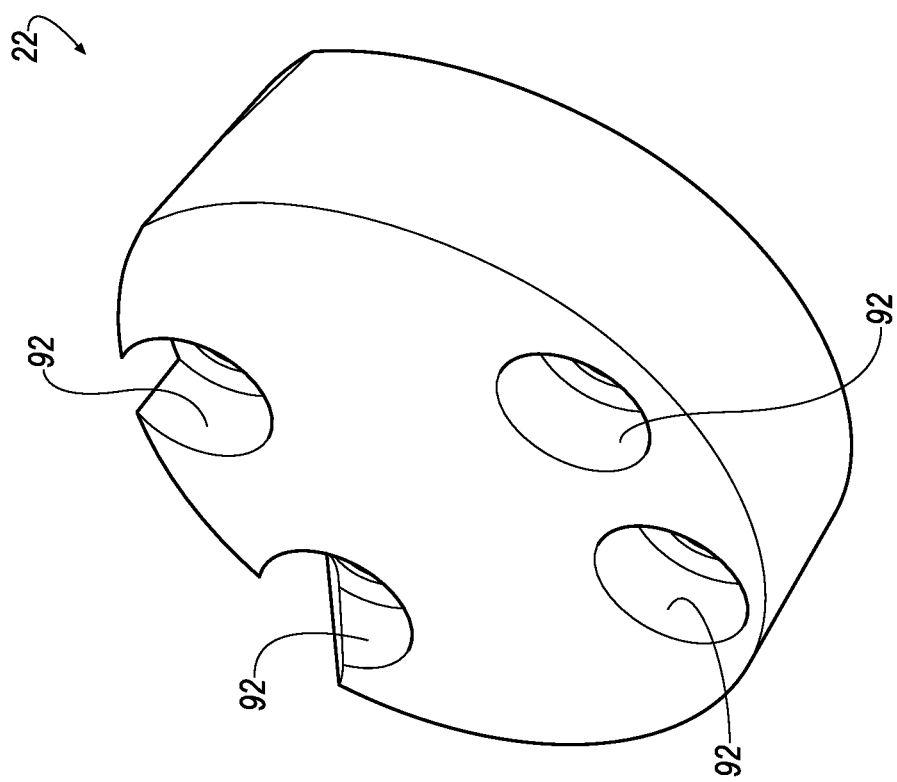
FIG. 10 is a perspective view of the end cap of the grooving tool.

Referring now to FIGS. 3 and 10, the end cap 22 attaches to an end 90 of the body 14 using a plurality of threaded fasteners (not shown), such as bolts, and the like, to retain the insert cartridge 18 within the tapered piston pocket 76 of the body 14. The threaded fasteners can be inserted through threaded mounting holes 92, 94 in the end cap 22 and in the end 90 of the body 14, respectively.

Referring now to FIGS. 1-3, the stopper 16 is disposed about the bushing 20. The stopper 16 may be held in place by a snap ring (not shown) inserted into a groove 96 on the body 14. One or more thrust washers (not shown) may be inserted inside the stopper 16, if desired. In addition, one or more optional spacer rings 98 may be used to select a desired cutting depth of the insert 100.

In operation, the shank 12 is moved in an axial direction and the piston-receiving portion 54 of the body 14 is inserted into a tube or other suitable work piece (not shown) until the stopper 16 contacts the work piece. As the shank 12 is further moved toward the work piece while the stopper 16 is contacting the work piece, the down feed springs 38 are compressed. The axial movement of the tapered piston 40 causes the extension surface 42 of the tapered piston 40 into contact with the piston-engaging face 78 of the insert cartridge 18. Due to the angle 50 and the inability of the insert cartridge 18 to move in the axial direction, the contact forces the insert cartridge 18 to move in radially outward direction proportional to the stroke of the tapered piston 40. The insert cartridge 18 pushes the cutting insert 100 into contact with the work piece and the shank 12 is rotated to begin a cutting operation. The amount of axial movement of the tapered piston 40 and the angle 50 determines the amount of radial movement of the cutting insert 100 and the depth of cut. In addition, the band 27 can be used as a visual aid to determine the depth of cut. For example, one end of the band 27 proximate the body 14 can be used as a visual aid to determine when the cutting insert 100 makes contact with the work piece, and the other end of the band 27 can be used as a visual aid to determine when the desired depth of cut has been achieved.

When the cutting operation is to be terminated, the shank 12 is moved in an axial direction that is opposite to the axial direction for insertion of the piston-receiving portion 54 of the body 14. The down feed springs 38 provide a biasing force to assist in the movement of the shank 12 in the opposite direction. The axial movement of the tapered piston 40 causes the retraction surface 44 of the tapered piston 40 into contact with the piston-retracting face 80 of the insert cartridge 18. Again, due to the angle 50 and the inability of the insert cartridge 18 to move in the axial direction, the contact forces the insert cartridge 18 to move in radially inward direction proportional to the stroke of the tapered piston 40 to retract the insert cartridge 18. The mechanical advantage provided by the interaction of the retraction surface 44 of the tapered piston 40 and the piston-retracting face 80 of the insert cartridge 18 ensures that the cutting insert 100 will be withdrawn and reduces the likelihood of fouling the work piece.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A mechanical-activated ID grooving tool, comprising:
a shank including a shank end and a working end, the working end including a tapered piston having an extension surface and a retraction surface forming an acute angle relative to a central longitudinal axis, $C_L$, of the tool;
a body disposed about the working end of the shank, the body including a shank-receiving portion and a piston-receiving portion, the piston-receiving portion including a pair of legs defining a central cavity therebetween,
an insert cartridge received in the central cavity of the body, the insert cartridge including a tapered piston pocket having a piston-engaging face, a piston-retracting face, the piston-retracting face having a first portion and a second portion formed at an angle with respect to the first portion, the piston-engaging face adjacent the extension surface of the tapered piston and the piston-retracting face adjacent the retraction surface of the tapered piston when the tool is assembled, the insert cartridge having an insert-receiving pocket capable of having a cutting insert mounted thereon;
a stopper disposed about a portion of the body;
an end cap mounted to an end of the body; and
a bushing disposed about a portion of the shank for allowing rotational movement of the shank, the body and the insert cartridge relative to the stopper,
wherein axial movement of the tapered piston in a first direction causes the extension surface of the tapered piston into contact with the piston-engaging face of the insert cartridge, thereby causing the insert cartridge to move in a radially outward direction, and
wherein axial movement of the tapered piston in a second, opposite direction causes the retraction surface of the tapered piston into contact with the piston-retracting face of the insert cartridge, thereby causing the insert cartridge to move in a radially inward direction, and
wherein the shank further includes a drive member located between the shank end and the working end, the drive member including a plurality of leaves that contact a plurality of down feed springs when the tool is assembled, the plurality of down feed springs providing a biasing force between the shank and the body.

2. The grooving tool according to claim 1, wherein an inner wall of the body further comprises a recess with three leaves corresponding in number and shape to the plurality of leaves of the shank such that the plurality of leaves of the shank are capable of being received in the recess.

3. A mechanical-activated ID grooving tool, comprising:
a shank including a shank end and a working end, the working end including a tapered piston having an extension surface and a retraction surface forming an acute angle relative to a central longitudinal axis, $C_L$, of the tool;
a body disposed about the working end of the shank, the body including a shank-receiving portion and a piston-receiving portion, the piston-receiving portion including a pair of legs defining a central cavity therebetween,
an insert cartridge received in the central cavity of the body, the insert cartridge including a tapered piston pocket having a piston-engaging face, a piston-retracting face, the piston-engaging face adjacent the extension surface of the tapered piston and the piston-retracting face adjacent the retraction surface of the tapered piston when the tool is assembled, the insert cartridge having an insert-receiving pocket capable of having a cutting insert mounted thereon;
a stopper disposed about a portion of the body;
an end cap mounted to an end of the body; and
a bushing disposed about a portion of the shank for allowing rotational movement of the shank, the body and the insert cartridge relative to the stopper,
wherein axial movement of the tapered piston in a first direction causes the extension surface of the tapered piston into contact with the piston-engaging face of the insert cartridge, thereby causing the insert cartridge to move in a radially outward direction, and
wherein axial movement of the tapered piston in a second, opposite direction causes the retraction surface of the tapered piston into contact with the piston-retracting face of the insert cartridge, thereby causing the insert cartridge to move in a radially inward direction, and wherein the piston-receiving portion of the body further includes at least one helically-shaped flute for facilitating removal of chips.

4. A mechanical-activated ID grooving tool, comprising:

a shank including a shank end and a working end, the working end including a tapered piston having an extension surface and a retraction surface forming an acute angle relative to a central longitudinal axis, $C_L$, of the tool;

a body disposed about the working end of the shank, the body including a shank-receiving portion and a piston-receiving portion, the piston-receiving portion including a pair of legs defining a central cavity therebetween, an insert cartridge received in the central cavity of the body, the insert cartridge including a tapered piston pocket having a piston-engaging face, a piston-retracting face, the piston-engaging face adjacent the extension surface of the tapered piston and the piston-retracting face adjacent the retraction surface of the tapered piston when the tool is assembled, the insert cartridge having an insert-receiving pocket capable of having a cutting insert mounted thereon;

a stopper disposed about a portion of the body;

an end cap mounted to an end of the body;

a bushing disposed about a portion of the shank for allowing rotational movement of the shank, the body and the insert cartridge relative to the stopper; and a fluid channel extending from the shank end to the working end of the shank;

wherein axial movement of the tapered piston in a first direction causes the extension surface of the tapered piston into contact with the piston-engaging face of the insert cartridge, thereby causing the insert cartridge to move in a radially outward direction, and wherein axial movement of the tapered piston in a second, opposite direction causes the retraction surface of the tapered piston into contact with the piston-retracting face of the insert cartridge, thereby causing the insert cartridge to move in a radially inward direction.

5. The grooving tool according to claim 4, wherein the body further comprising a port to allow fluid to pass from the fluid channel of the shank, through the port, and proximate the cutting insert.

6. The grooving tool according to claim 1, wherein the angle is between about 1° and about 15°.

7. The grooving tool according to claim 1, further comprising a band disposed about the shank for providing a visual aid as to a depth of cut of the cutting insert.

* * * * *